US005944415A

United States Patent [19]

Kurita et al.

[11] Patent Number: 5,944,415

[45] Date of Patent: Aug. 31, 1999

[54] VEHICLE HEADLAMP REFLECTOR WITH EXTENSION AND STEP IMITATING SURFACES

[75] Inventors: Takashi Kurita; Shinji Watanabe, both of Shizuoka, Japan

[73] Assignee: Koito Manufacturing Co., Ltd., Tokyo, Japan

[21] Appl. No.: 08/897,562

[22] Filed: Jul. 15, 1997

[30] Foreign Application Priority Data

Jul. 31, 1996 [JP] Japan .................................... 8-219310

[51] Int. Cl.[6] ........................................................ B60Q 1/04

[52] U.S. Cl. .......................... 362/518; 362/517; 362/301; 362/346

[58] Field of Search ..................................... 362/514, 517, 362/518, 301, 346, 298

[56] References Cited

U.S. PATENT DOCUMENTS

| | | | |
|---|---|---|---|
| 5,373,423 | 12/1994 | Liedtke | 362/518 |
| 5,396,407 | 3/1995 | Taniuchi | 362/518 |
| 5,577,833 | 11/1996 | English | 362/297 |

*Primary Examiner*—Sandra O'Shea
*Assistant Examiner*—Marshall Honeyman
*Attorney, Agent, or Firm*—Sughrue, Mion, Zinn, Macpeak & Seas, PLLC

[57] ABSTRACT

In a vehicle lamp, an upper wall and a lower wall are extended forwardly from the upper and lower edge of the main reflecting surface of a concave reflector in such a manner that the upper wall and the lower wall are substantially in parallel with the optical axis of the main reflecting surface, the upper wall has an inner surface in which a step surface is formed, and a mirror-finished flat surface is formed in the inner surface of the lower wall.

12 Claims, 4 Drawing Sheets

VEHICLE HEADLAMP REFLECTOR WITH EXTENSION AND STEP IMITATING SURFACES

BACKGROUND OF THE INVENTION

1. Field of the Invention

The present invention relates to a vehicle lamp which improves the appearance of a lamp chamber interior configuration including a reflector which can be observed through a lens covering the opening of the lamp body.

2. Related Art

In a recent vehicle lamp, especially a headlamp, because of the improvement in technology of light distribution by a reflector, a so-called "no-step lens" is popularly employed in which there is no lens step on a surface of the lens covering the front opening of lamp body. An example of the conventional vehicle lamp of this type is shown in FIG. 8. According to the vehicle lamp shown in FIG. 8, a lamp chamber 8 is defined by covering a front opening of a lamp body 51 with a lens 52. A reflector 54 having a concave mirror adapted to form a predetermined light distribution pattern is pivotably arranged in the lamp chamber 53. A lamp bulb 55 is positioned at the focal point F of the reflector 54, and a shade 56 adapted to obtain a predetermined light distribution is provided ahead of the bulb 55.

In general, the reflector 54 is designed as follows: That is, the reflector 54 has a light reflecting stepped surface 57*a* as the inner surface of its main reflecting surface 57 which extends vertically to control, when the lamp is turned on, a predetermined light distribution pattern, especially a light distribution pattern spread horizontally. In addition, the reflector 54 has an upper wall 58 and a lower wall 59 respectively along the upper and lower edges thereof which regulate the emergence of light which is made vertically and forwardly of the lamp and are in correspondence to the configuration of the lamp. The inner surfaces of those upper and lower walls 58 and 59 are mirror-finished so as not to form an unwanted glare light when the lamp is turned on.

The above-described vehicle lamp suffers from the following difficulty: As was described above, no lens step is formed on the surface of the lens 52; that is, the interior of the lamp chamber 53 can be observed directly through the lens 52. Therefore, the step surface 57 formed on the main reflecting surface of the reflector 54, and the flat surfaces of the upper wall 58 and the lower wall 59 which have been mirror-finished can be clearly observed. Hence, irregularly designed configurations in the lamp chamber 53 are observed from the front of the lamp; that is, the appearance of the lamp is deteriorated or made unattractive as a whole.

SUMMARY OF THE INVENTION

In view of the foregoing, an object of the invention is to provide a vehicle lamp in which a step surface is formed on an inner surface of an upper wall of a reflector, and the step surface thus formed is reflected by a surface of a lower wall of the reflector, so that a person observes the lower wall through the lens as if a step surface were formed also on the surface of the lower wall, whereby the upper and lower walls appear harmonious with the design configuration of the reflector; that is, the vehicle lamp appears attractive when observed from the front.

Specific features of a vehicle lamp of the invention reside in that an upper wall and a lower wall extend forwardly from the upper and lower edge of the main reflecting surface of a concave reflector in such a manner that the upper wall and the lower wall are substantially in parallel with the optical axis of the main reflecting surface of the reflector; the upper wall has an inner surface which is a step surface; and the lower surface is a mirror-finished flat surface.

In the vehicle lamp of the invention, further, the step surface of the upper wall may be made up of a number of cylindrical reflecting elements which are extended in a front-to-rear direction and juxtaposed. Furthermore, in the vehicle lamp, the concave reflector is accommodated in a lamp chamber, a light bulb is supported on the bottom of the reflector, a frame-shaped extension is set around the outer periphery of the reflector, and the surface of the extension has the same step surface as the inner surface of the main reflecting surface of the reflector or the inner surface of the upper wall.

Moreover, in the vehicle lamp, the projection of the step surface of the upper wall of the reflector onto the lower surface of the reflector is harmonious with the step surface formed in the main reflecting surface, whereby the resultant vehicle lamp is uniform in the effect of visual recognition.

In addition, it is desirable that the surface of a lens which covers the front opening of a lamp body has no step, and a shade is arranged in front of the light bulb in such a manner that the shade is located near the light bulb to shut-off the emergence of light towards the upper wall of the reflector.

In the vehicle lamp thus designed, the step surface formed in the surface of the upper wall projects through onto the lower wall which is mirror-finished. Hence, the surface of the lower wall is observed as if a step surface were formed thereon. This step surface is harmonious in design with the step surface formed on the surface of the main reflecting surface of the reflector, which makes the interior of the lamp chamber attractive.

DESCRIPTION OF THE PREFERRED EMBODIMENTS

A vehicle lamp, which constitutes a preferred embodiment of the invention, will now be described with reference to the accompanying drawings.

Figure 1:
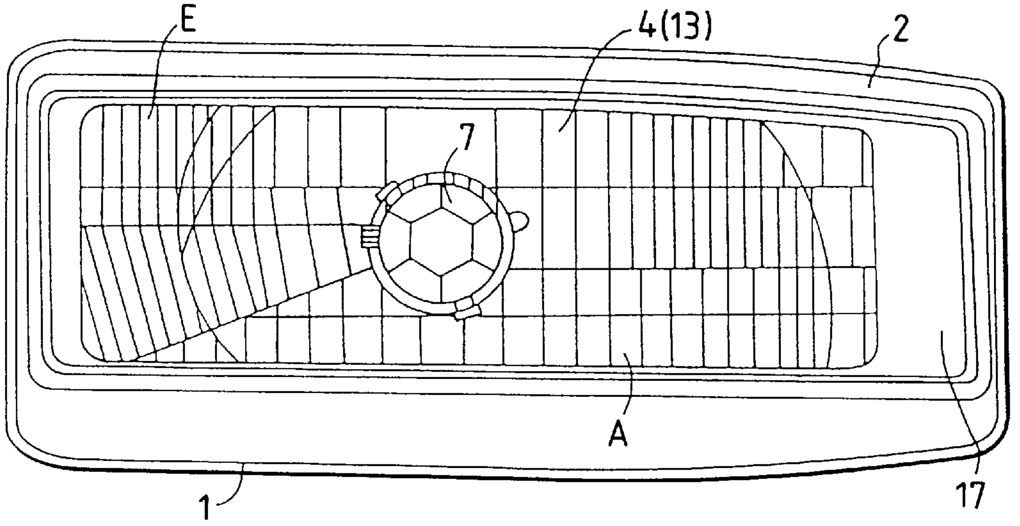
FIG. 1 is a front view of a vehicle lamp according to the invention.
Figure 2:
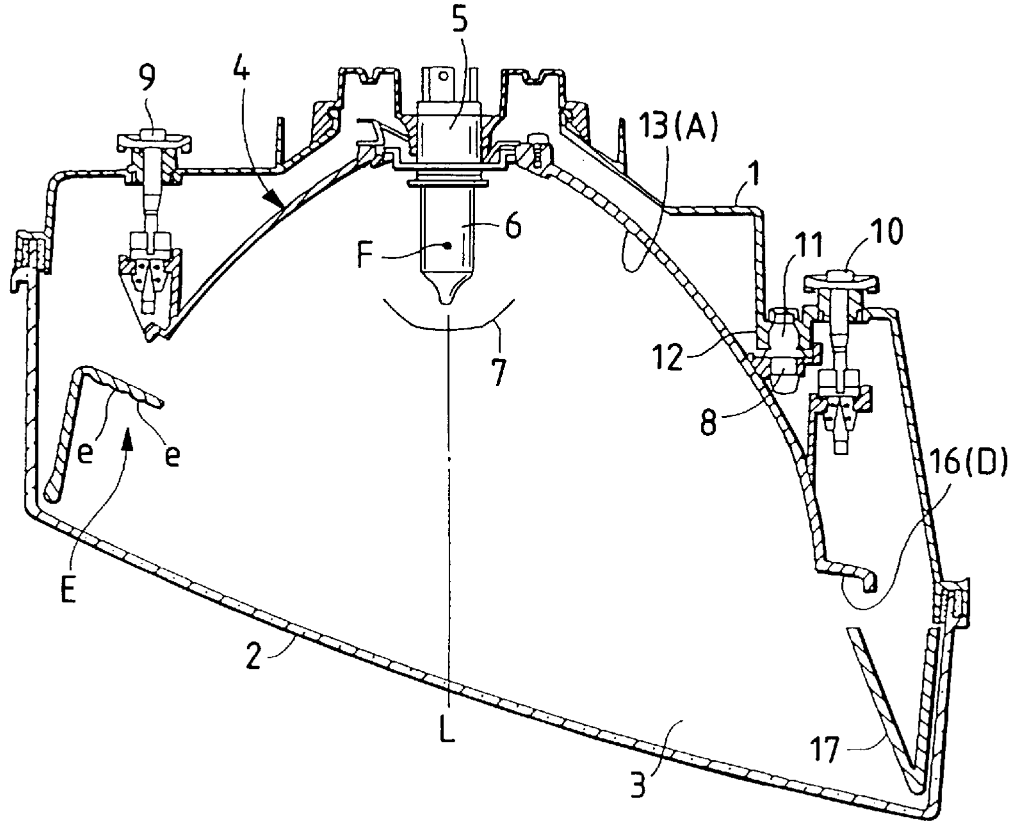
FIG. 2 is a horizontal sectional view of the vehicle lamp shown in FIG. 1.
Figure 3:
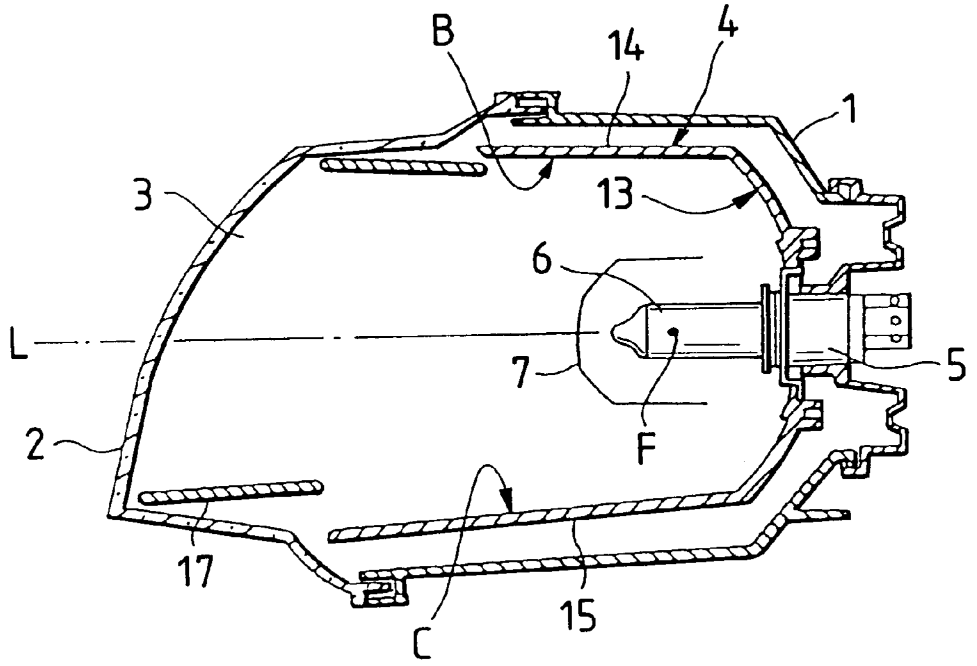
FIG. 3 is a vertical sectional view of the vehicle lamp shown in FIG. 1.

FIGS. 1 through 3 show the whole vehicle lamp according to the invention. As shown in those figures, a front opening of a lamp body 1 is covered with a lens to define therein a lamp chamber 3. In the chamber 3, a reflector 4 is pivotably mounted with the aid of an illumination angle adjusting mechanism (described later). At the focal point F on the optical axis L of the reflector 4, the light bulb 6 is fixedly mounted with the aid of a bulb socket 5. The lens 2 of the vehicle lamp of the invention employs a so-called "no-step lens", i.e., no lens steps are formed on the inner surface of the lens 2. That is, the structure of the reflector, and the configuration of the shade 7 are utilized to obtain the desired light distribution pattern of the vehicle lamp. The interior of the lamp chamber 3 can be directly observed through the aforementioned lens 2.

The reflector 4 is tiltably mounted on the lamp body 1 with the aid of a pivot 8, a horizontal inclination adjusting screw 9 and a vertical inclination adjusting screw 10 which form the aforementioned illumination angle adjusting mechanism as illustrated in FIG. 2. The pivot 8 is designed as follows: That is, it is located near the center of one side wall of the reflector, and has a ball member 11 which protrudes backwardly. The ball member 11 is rotatably fitted in a ball receiving member 12 which is fixedly formed in the inner surface of the lamp body 3. That is, the reflector 4 is so supported that it is horizontally and vertically tiltable around the pivot 8.

Figure 4:
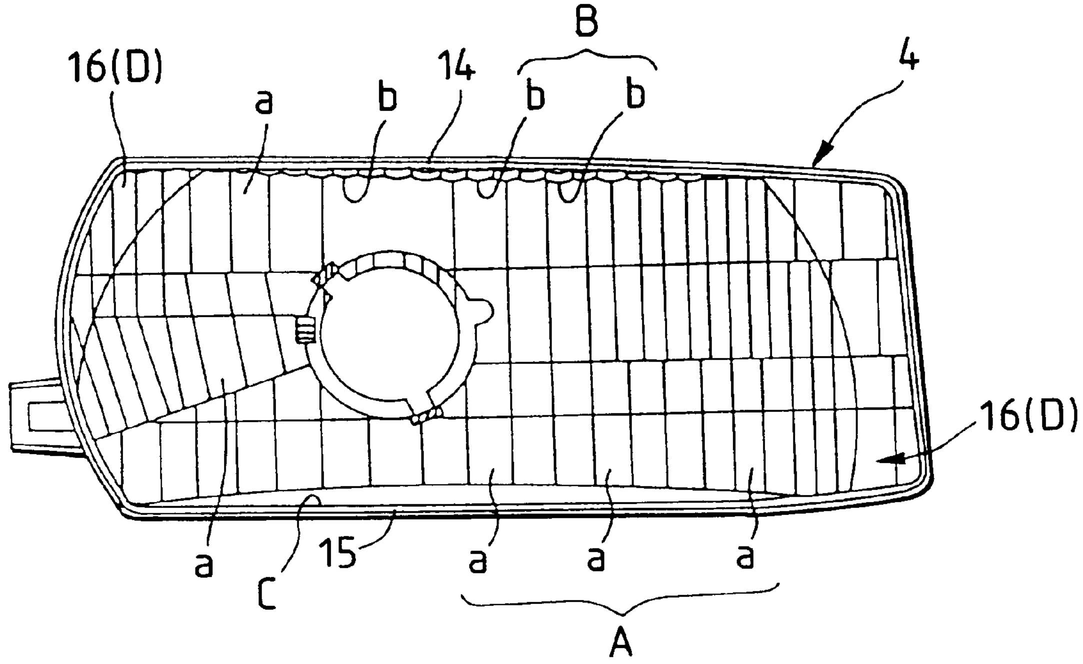
FIG. 4 is a front view of the reflector of the vehicle lamp according to the invention.
Figure 5:
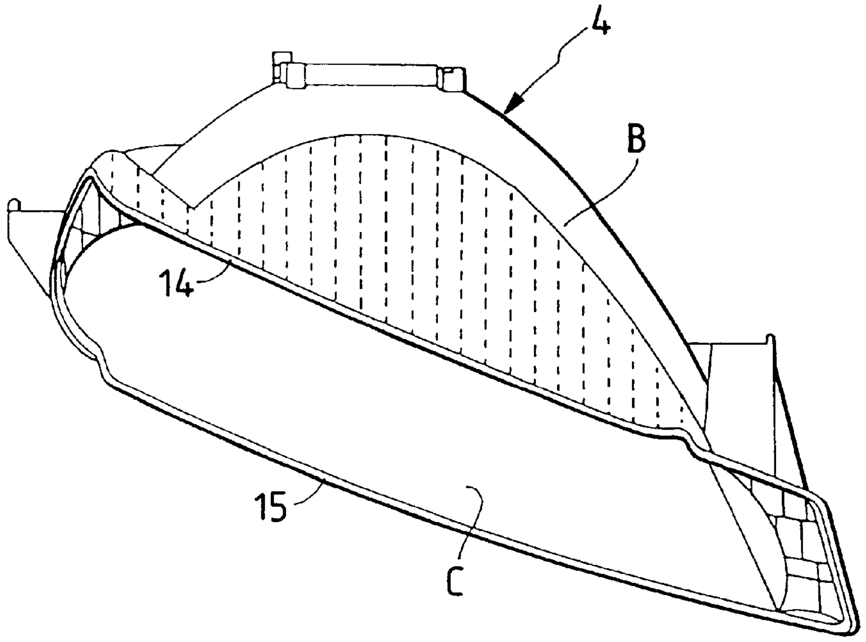
FIG. 5 is a plan view of the reflector shown in FIG. 4.

As shown in FIGS. 4 and 5, FIG. 3 the reflector 4 has a main reflecting surface 13, and the whole inner surface of the main reflecting surface 13 is a step surface A (see FIG. 4) which is made up of a number of vertically extending cylindrical reflecting elements a which are arranged horizontally. The step surface A has the upper and lower edges, along which the upper and lower walls 14 and 15 extend, respectively, which are substantially in parallel with the optical axis L of the main reflecting surface 13. The number of cylindrical reflecting elements a forming the step surface A is chosen to form the aforementioned desired light distribution pattern of the vehicle lamp, and are changed in position and in size for each of several blocks of the inner surface of the main reflecting surface 13. The inner surface of the upper wall 14 is a step surface B (FIGS. 3–5) which is made up of a number of cylindrical reflecting elements b which extend in a front-to-rear direction in correspondence to the reflecting elements a of the main reflecting surface 13 in such a manner that they are juxtaposed. Furthermore, the surface of the lower wall 15 is a reflecting surface C (FIGS. 3–5) which is flat and mirror-finished. The upper wall 14 and the lower wall 15 are substantially in parallel with the optical axis L of the reflector 4.

Therefore, in the case where the interior configuration of the lamp chamber 3 is observed through the lens 2 from the front, the step surface B on the inner surface of the upper wall 14 is projected on the reflecting surface C of the lower wall 15. Hence, it is observed as if the step surface equal to the step surface B of the upper wall 14 were formed on the surface of the lower wall 15.

The end of the opening of the reflector 4 has a flat surface 16 which is formed by bending the main reflecting surface 13. The flat surface 16, or dummy step surface D, is observed as if it were an extension of the step surface A.

An extension 17 is provided in front of the reflector 4 in such a manner that it surrounds the outer periphery of the reflector 4. The extension 17 covers the gap of the outer periphery, with respect to the inner surface of the lamp body 1, of the reflector 4 which is freely pivotably provided in the lamp chamber, thereby to improve the design of the interior of the lamp chamber 3.

Figure 6:
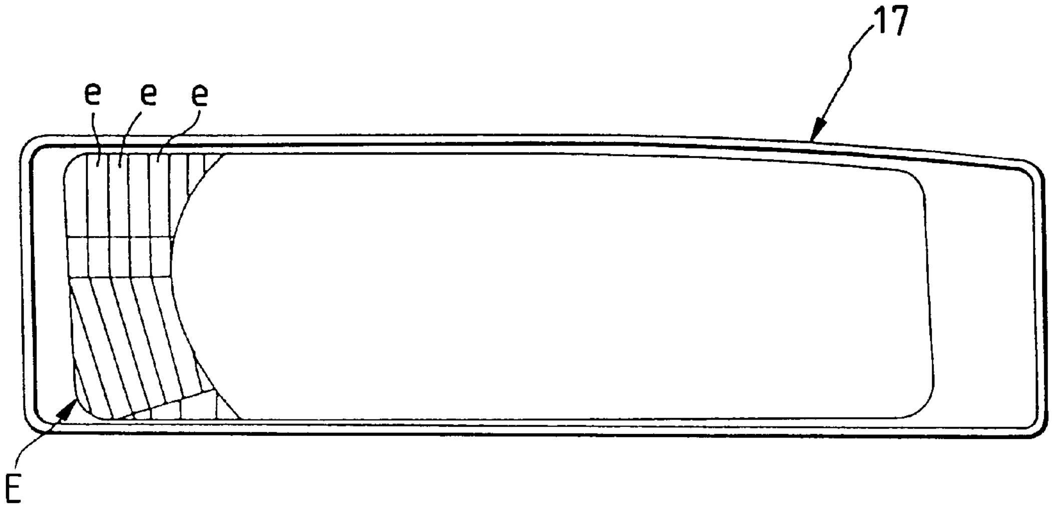
FIG. 6 is a front view of an extension in the vehicle lamp according to the invention.
Figure 7:
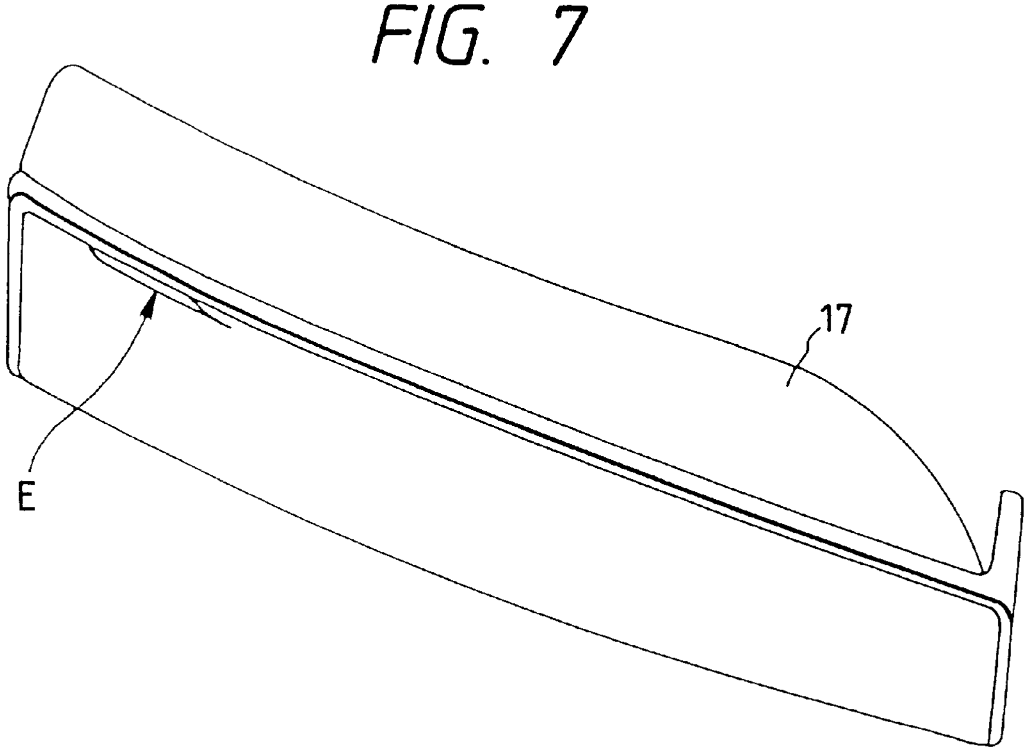
FIG. 7 is a plan view of the extension shown in FIG. 6.
Figure 8:
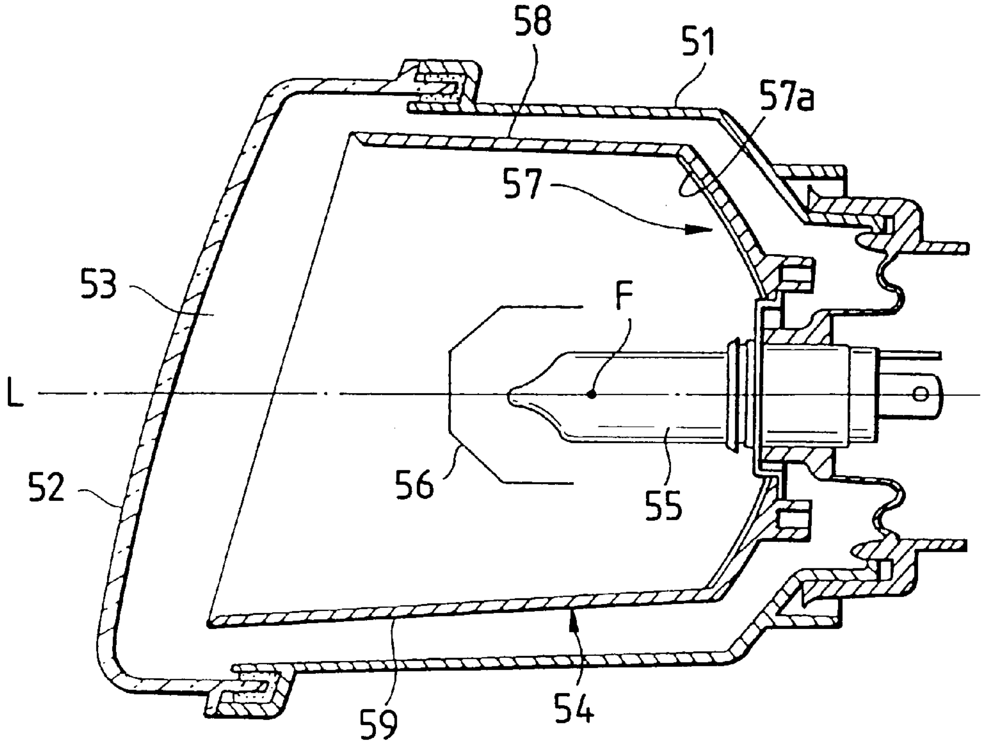
FIG. 8 PRIOR ART
FIG. 8 is a vertical sectional view of a conventional vehicle lamp.

More specifically, the extension 17 is fixedly secured to the inside of the front opening of the lamp body 1, and its surface is mirror-finished. As shown in FIGS. 6 and 7, the front surface of the extension is formed into a step surface E which is made up of a number of cylindrical reflecting elements e which extend vertically and are equal to those of the step surface A formed in the inner surface of the main reflecting surface 13 and to those of the step surface B formed on the upper wall 14. The step surface E together with the step surface A of the main reflecting surface 13 and the step surface B of the upper wall 14 uniformly forms a step configuration in the interior of the lamp chamber 3 which appears deep as a whole. Hence, the provision of the step surface E will not spoil the design of the lamp even when the lamp has the so-called "no-step lens".

With the vehicle lamp of the invention, when the bulb is turned on, the light emitted towards the upper wall 14 is intercepted by the shade 7, and therefore the step surface A will form no glare light. When the bulb is off, the step surface B formed in the inner surface of the upper wall projects onto the reflecting surface C of the lower wall 15, and therefore the interior of the lamp chamber 3 appears uniform in design.

In the vehicle lamp of the invention, the cylindrical reflecting elements formed in the step surfaces A, B, D and E may be concave or convex in section. It goes without saying that, when modified, the technical concept of the invention may be applied to a vehicle lamp in which the reflector is integral with the inner surface of the lamp body.

The vehicle lamp of the invention is designed as described above. Hence, when viewed from the front, the vehicle lamp is attractive, and furthermore the lens load can be decreased. These effects or merits should be highly appreciated in practical use.

What is claimed is:

1. A vehicle lamp comprising:

a lamp body having a front opening;

a lens coupled to the front opening of said lamp body;

a lamp chamber defined by said lamp body and said lens;

a lamp bulb mounted to said lamp body and positioned within said lamp chamber; and a concave reflector mounted on said lamp body and accommodated in said lamp chamber, and said reflector comprising:

a main reflecting surface; an upper wall extending forwardly from an upper edge of said main reflecting surface substantially in parallel with an optical axis of said main reflecting surface, said upper wall comprising an inner surface having a step surface; and a lower wall extending forwardly from a lower edge of said main reflecting surface substantially in parallel with the optical axis of said main reflecting surface, said lower surface comprising a mirror-finished flat surface, further comprising a frame-shaped extension mounted around an outer periphery of said reflector, a surface of said extension forming thereon the same step surface as at least one of the inner surface of said main reflecting surface of said reflector and the inner surface of said upper wall thereof.

2. A vehicle lamp as claimed in claim 1, wherein said step surface of said upper wall is made up of a number of cylindrical reflecting elements extending in a front-to-rear direction.

3. A vehicle lamp as claimed in claim 1, wherein the whole inner surface of said main reflecting surface is formed with a step surface made up of a number of vertically extending cylindrical reflecting elements which are arranged horizontally.

4. A vehicle lamp as claimed in claim 1, wherein said lens is formed with no lens steps.

5. A vehicle lamp as claimed in claim 1, further comprising a shade arranged in front of said light bulb near said light bulb.

6. A vehicle lamp comprising:

a lamp body having a front opening;

a lens coupled to the front opening of said lamp body;

a lamp chamber defined by said lamp body and said lens;

a lamp bulb mounted to said lamp body and positioned within said lamp chamber; and a concave reflector mounted on said lamp body and accommodated in said lamp chamber, and said reflector comprising:

a main reflecting surface; an upper wall extending forwardly from an upper edge of said main reflecting surface substantially in parallel with an optical axis of said main reflecting surface, said upper wall comprising an inner surface having a step surface; and a lower wall extending forwardly from a lower edge of said main reflecting surface substantially in parallel with the optical axis of said main reflecting surface, said lower surface comprising a mirror-finished flat surface, wherein the reflection of said step surface of said upper wall of said reflector onto said lower surface of said reflector is harmonious with said step surface formed in said main reflecting surface.

7. A vehicle lamp as claimed in claim 6, wherein said step surface of said upper wall is made up of a number of cylindrical reflecting elements extending in a front-to-rear direction.

8. A vehicle lamp as claimed in claim 6, wherein the whole inner surface of said main reflecting surface is formed with a step surface made up of a number of vertically extending cylindrical reflecting elements which are arranged horizontally.

9. A vehicle lamp as claimed in claim 6, wherein said lens is formed with no lens steps.

10. A vehicle lamp as claimed in claim 6, further comprising a shade arranged in front of said light bulb near said light bulb.

11. A reflector for a vehicle lamp, comprising:

a main reflecting surface;

an upper wall extending forwardly from an upper edge of said main reflecting surface substantially in parallel with an optical axis of said main reflecting surface, said upper wall comprising an inner surface having a step surface; and a lower wall extending forwardly from a lower edge of said main reflecting surface substantially in parallel with the optical axis of said main reflecting surface, said lower surface comprising a mirror-finished flat surface, wherein the reflection of said step surface of said upper wall of said reflector onto said lower surface of said reflector is harmonious with said step surface formed in said main reflecting surface.

12. A reflector for a vehicle lamp, comprising:

a main reflecting surface;

an upper wall extending forwardly from an upper edge of said main reflecting surface substantially in parallel with an optical axis of said main reflecting surface, said upper wall comprising an inner surface having a step surface; and a lower wall extending forwardly from a lower edge of said main reflecting surface substantially in parallel with the optical axis of said main reflecting surface, said lower surface comprising a mirror-finished flat surface, wherein said step surface is projected on said mirror-finished flat surface of said lower wall to make said lower wall appear as if it has said step surface of said upper wall.

* * * * *